UNITED STATES PATENT OFFICE.

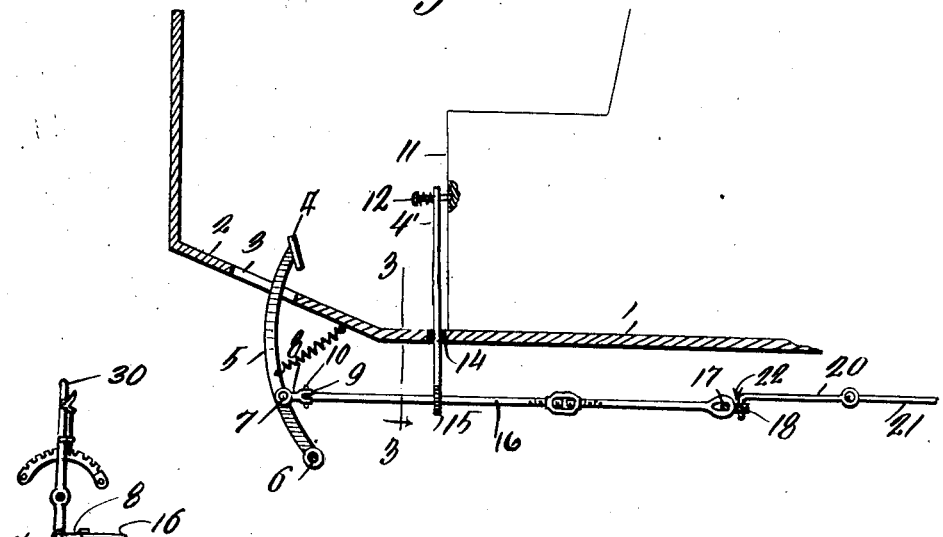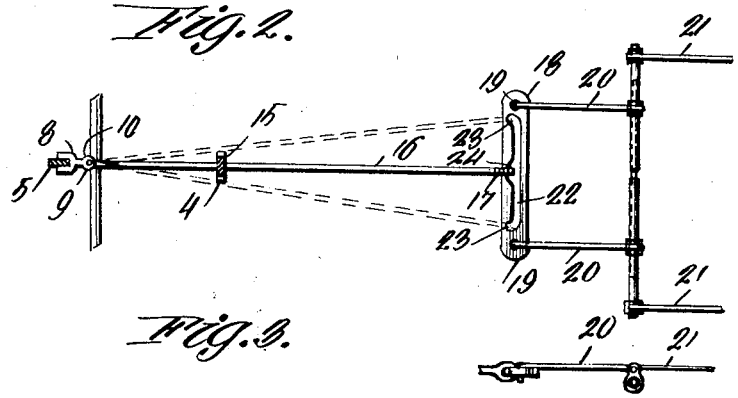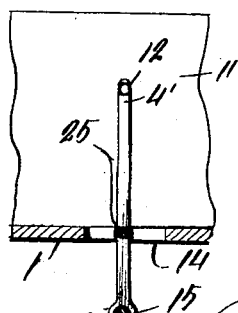

MAX VON BABO, OF SEATTLE, WASHINGTON.

AUTOMOBILE ATTACHMENT.

1,389,717. Specification of Letters Patent. Patented Sept. 6, 1921.

Application filed January 2, 1920. Serial No. 348,809.

*To all whom it may concern:*

Be it known that I, MAX VON BABO, a citizen of the United States, residing at Seattle, in the county of King and State of Washington, have invented certain new and useful Improvements in Automobile Attachments, of which the following is a specification.

This invention relates to an automobile attachment and has for its principal object the production of an efficient automobile braking means.

Another object of this invention is to produce braking means which may be applied to either of the rear wheels at will or to both.

Another object of the invention is to produce braking means which may be easily substituted for the braking means now usually provided upon automobiles.

In the drawing,

Figure 1 is a longitudinal section taken through an automobile, showing this attachment attached thereto.

Fig. 2 is a top plan view of the device showing how the same is operated.

Fig. 3 is a section on the line 3—3 of Fig. 1 looking in the direction of the arrow.

Fig. 4 is a fragmentary elevation of Fig. 2.

Fig. 5 is an elevation of a hand lever which may be used with or without the foot pedal.

By referring to the drawing by numerals it will be seen that 1 indicates the floor of an ordinary automobile which is provided with the dash portion 2. This dash portion 2 is provided with the elongated slot 3 through which passes the pedal 4 or a hand lever 30. The pedal 4 is provided with the curved arm 5 which is pivoted upon the axis 6. The curved arm 5 is provided with a lug 7 upon which is pivotally mounted the link 8. The hand lever 30 will be attached to the link 8 by a lug 7.

The lever 4' is pivoted in the slot 14 at 25 and is provided at its lower end with the eye 15. A latch 12 is provided for holding the lever 4' in the desired position. The eye 15 is substantially of the same level as the lug 7. Passing through the eye 15 is the rod 16 which is connected with the link 8 by means of the pin 10. At the other end of the rod 16 is provided a slotted portion 17. An elongated slotted member is provided so as to be in slidable relation with the member 18. This elongated slotted member 18 is provided at each end with the eyes 19 so as to receive the two links 20, which engage the brake rods 21 as is clearly shown in Fig. 2 of the drawings. A slot 22 is provided in the elongated slotted member 18 and is provided with the indentures 23 at each end and the indenture 24 in the center. A lever 4' it will be seen by referring to Fig. 3 is pivoted by means of the lug 25 so that this lever 4' will control the rod 16 thereby placing the same in either of the three indentures of the slot 22 while the spring pressed latch 12 will hold the lever 4' in a corresponding position.

The operation of this device is that when the rod 16 is in the center indenture 24 it will operate both the rear brakes appearing on the two rear wheels. If, however, this rod 16 is shifted by means of the pivoted lever 4, into either of the indentures 23 it will be seen that only one of the rear brakes will be operated and that the other brake will allow the opposite wheel to rotate freely.

From the above description it will be seen that a simple means has been provided whereby braking may be applied to either of the rear wheels or both as may suit the convenience of the operator. It will be seen that this may be accomplished by the operator without him leaving his station by means of the convenient lever 4.

Having thus fully described my invention, what I claim as new and desire to secure by Letters Patent is:—

1. In combination, an operating lever, a connecting rod attached to the operating lever, brake operating means provided for each rear vehicle wheel, means connecting the brake operating means with the connecting rod and means for positioning the connecting rod so as to actuate, upon movement of the operating lever, either of the brake operating means or both.

2. A device of the class described adapted to be used with a vehicle comprising an operating lever, a connecting rod, an elongated slotted bar, means for connecting the ends of said bar with the corresponding rear braking means of a vehicle, said connecting rod attached to said bar and adapted to slide in the said slot, means provided for shifting said rod with relation to said bar, whereby either or both of the rear brakes may be operated.

3. A device of the class described comprising an operating lever, a connecting rod, means for flexibly attaching said rod to said operating lever, an elongated slotted bar adapted to be held in slidable relation with said rod, means provided for attaching each end of said bar to the corresponding rear brake of a vehicle, a lever attached to the vehicle, said rod adapted to pass through an eye provided at the bottom end of said lever so that said rod may be shifted whereby either of the rear brakes or both of the rear brakes of a vehicle may be operated as the operator may choose.

In testimony whereof I affix my signature in presence of two witnesses.

MAX VON BABO.

Witnesses:
Mrs. A. VON BABO,
Miss E. VON BABO.